United States Patent
Liu et al.

(10) Patent No.: US 11,695,511 B2
(45) Date of Patent: Jul. 4, 2023

(54) COMMUNICATION METHOD AND APPARATUS IN A POINT-TO-MULTIPOINT COMMUNICATION NETWORK

(71) Applicant: Huawei Technologies Co., Ltd., Guangdong (CN)

(72) Inventors: Xiang Liu, Marlboro, NJ (US); Huaiyu Zeng, Red Bank, NJ (US); Frank Effenberger, Frisco, TX (US); Yuanqiu Luo, Cranbury, NJ (US); Andy Shen, Morganville, NJ (US)

(73) Assignee: Huawei Technologies Co., Ltd., Shenzhen (CN)

( * ) Notice: Subject to any disclaimer, the term of this patent is extended or adjusted under 35 U.S.C. 154(b) by 205 days.

(21) Appl. No.: 16/995,995

(22) Filed: Aug. 18, 2020

(65) Prior Publication Data
US 2020/0382241 A1 Dec. 3, 2020

Related U.S. Application Data

(63) Continuation of application No. PCT/CN2019/091221, filed on Jun. 14, 2019.
(Continued)

(51) Int. Cl.
*H04L 1/08* (2006.01)
*H04J 3/16* (2006.01)
(Continued)

(52) U.S. Cl.
CPC .............. *H04L 1/08* (2013.01); *H04J 3/1694* (2013.01); *H04L 1/0009* (2013.01);
(Continued)

(58) Field of Classification Search
CPC ..... H04L 1/08; H04L 13/1694; H04L 1/0009; H04L 1/0041; H04L 1/0071; H04L 1/0001; H04Q 11/67
(Continued)

(56) References Cited

U.S. PATENT DOCUMENTS 10,009,673 B1 * 6/2018 Liu ................... H04W 88/085
2003/0031198 A1 * 2/2003 Currivan ........... H03M 13/2707
370/465

(Continued)

FOREIGN PATENT DOCUMENTS

CN 1802809 A 7/2006
CN 101945077 A 1/2011
(Continued)

OTHER PUBLICATIONS

Van Der Linden et al., "Increasing flexibility and capacity in real PON deployments by using 2/4/8-PAM formats", IEEE/OSA Journal of Optical Communications and Networking, vol. 9, No. 1, pp. A1-A8, Jan. 2017.
(Continued)

*Primary Examiner* — Kwang B Yao
*Assistant Examiner* — Syed M Bokhari
(74) *Attorney, Agent, or Firm* — Vierra Magen Marcus LLP

(57) ABSTRACT

A communication method and device are provided for communication in a point-to-multi-point communication network. A communication method includes receiving, by a node of a plurality of multi-point nodes, a transmission frame comprising a header including a repetition information and a data section comprising multiple modulation symbols, with at least two repeated modulation symbols that are repeated to represent a first modulation symbol; extracting, by the node, the repetition information of the header; recovering, by node, the amplitude of each modulation symbol of the at least two repeated modulation symbols; and combining, by the node, the amplitudes of the at least two repeated modulation symbols, based on the repetition information, to reconstruct the first modulation symbol represented by the at least two repeated modulation symbols.

31 Claims, 13 Drawing Sheets

Related U.S. Application Data

(60) Provisional application No. 62/745,778, filed on Oct. 15, 2018.

(51) Int. Cl.
*H04L 1/00* (2006.01)
*H04Q 11/00* (2006.01)

(52) U.S. Cl.
CPC .......... *H04L 1/0041* (2013.01); *H04L 1/0071* (2013.01); *H04Q 11/0067* (2013.01)

(58) Field of Classification Search
USPC .................................................. 370/329, 465
See application file for complete search history.

(56) References Cited

U.S. PATENT DOCUMENTS

| | | | | |
|---|---|---|---|---|
| 2009/0161749 | A1* | 6/2009 | Nangia | H04L 5/0007 375/233 |
| 2009/0245792 | A1 | 10/2009 | Oishi et al. | |
| 2009/0276681 | A1* | 11/2009 | Ou | H04L 1/0045 714/752 |
| 2018/0220305 | A1* | 8/2018 | Lei | H04W 16/14 |

FOREIGN PATENT DOCUMENTS

| | | | |
|---|---|---|---|
| CN | 103095629 | * | 11/2011 |
| CN | 103095629 A | * | 11/2011 |
| CN | 102291633 A | | 12/2011 |
| CN | 103095629 A | | 5/2013 |
| CN | 105210433 A | | 12/2015 |
| CN | 108541362 A | | 9/2018 |

OTHER PUBLICATIONS

Notice of Allowance dated Jan. 25, 2022, Chinese Application No. 201980042156.7.

Office Action dated Oct. 11, 2021, Chinese Application No. 201980042156.7.

Frank, Tobias et al., "IFDMA—A Promising Multiple Access Scheme for Future Mobile Radio Systems", in Proc. of PIMRC2005, Berlin, Germany, Sep. 2005, pp. 1-5.

* cited by examiner

COMMUNICATION METHOD AND APPARATUS IN A POINT-TO-MULTIPOINT COMMUNICATION NETWORK

CROSS-REFERENCE TO RELATED APPLICATIONS

This application is a continuation of and claims the benefit of priority to International Application No. PCT/CN2019/091221, filed Jun. 14, 2019, and entitled "COMMUNICATION METHOD AND APPARATUS IN A POINT-TO-MULTIPOINT COMMUNICATION NETWORK", which application claims the benefit of priority to U.S. Provisional Application No. 62/745,778, filed on Oct. 15, 2018, entitled "COMMUNICATION METHOD AND APPARATUS IN A POINT-TO-MULTIPOINT COMMUNICATION NETWORK," which applications are hereby incorporated by reference.

FIELD

The disclosure generally relates to a communication network, and more specifically to an optical communication network including communication between a point node and multi-point nodes, wherein the optical communication network supports a wide range of power budgets.

BACKGROUND

Some network topologies impart variations in the physical characteristics among different transmission paths of the network. For example, a passive optical network (PON) typically consists of an optical line terminal (OLT), such as a central office, connected to a number of user terminals (e.g., optical network units or ONUs). The topology of the PON results in variation among transmission characteristics between different OLT-Optical Network Unit (ONU) pairs. As a result, different users experience different signal loses, depending upon various circumstances of the network, including distance from a central office (CO) and/or the quality of the physical connections (e.g., quality of the connectors) in the network. These differences in network parameters result in different power requirements that define the amount of power necessary to transmit a signal over the network with the same quality (e.g., same bite error rate (BER)). In some networks, this difference between transmissions to different users, measured by received downlink power (dB), may be as great as 20 dB. Accordingly, different users in the same network have dramatically different power requirements in order to maintain a similar signal quality.

Current conventional PONs use on-off keying (OOK) modulation in the network, regardless of actual path losses. However, statistics, acquired from commercial gigabit passive optical network (GPON) deployments show significant path loss differences among the users (i.e., among the optical network units). If the network is designed to support the user terminals with the greatest power loss, then network resources are consequently wasted on user terminals that do not require a higher power level.

To accommodate this, some existing networks employ flexible modulation, wherein a user terminal requiring a higher power level might use pulse amplitude modulation (PAM) of various types/levels, while using OOK modulation for lower power level user terminals. The use of flexible modulation allows for accommodation of different link loss budgets across the network. However, the PAM modulation schemes have worse receiver sensitivity than using OOK modulation for the same data rate, and therefore are more difficult to implement in a clock and data recover (CDR) scheme than in a non-return to zero (NRZ) scheme. Further, the use of different modulation types in some network paths significantly complicates operation of the network, and may create different and additional difficulties in the network.

BRIEF SUMMARY

According to one aspect of the disclosure, there is provided a communication method in a point-to-multi-point communication network, comprising receiving, by a node of the point-to-multi-point communication network, a transmission frame comprising a header including repetition information and a data section comprising multiple modulation symbols, with at least two repeated modulation symbols that are repeated to represent a first modulation symbol; extracting, by the node, the repetition information of the header; quantifying, by the node, the amplitude of each modulation symbol of the at least two repeated modulation symbols; and combining, by the node, the amplitudes of the at least two repeated modulation symbols, based on the repetition information, to reconstruct the first modulation symbol represented by the at least two repeated modulation symbols.

Optionally, in any one of the preceding aspects, the node comprises a point node or a multi-point node of a plurality of multi-point nodes in the point-to-multi-point communication network.

Optionally, in any one of the preceding aspects, the point-to-multi-point network comprises a passive optical network (PON), the transmission frame comprises an optical transmission frame, the point node comprises an optical line terminal (OLT), and the plurality of multi-point nodes comprise a plurality of optical network units (ONUs).

Optionally, in any one of the preceding aspects, the method further comprising performing, by the node, equalization on the two or more repeated modulation symbols before the combining.

Optionally, in any one of the preceding aspects, the combining comprising performing, by the node, soft addition of the amplitudes of the two or more repeated modulation symbols.

Optionally, in any one of the preceding aspects, the combining comprising performing, by the node, averaging of the amplitudes of the two or more repeated modulation symbols.

Optionally, in any one of the preceding aspects, the received transmission frame comprises an on-off-keying (OOK) modulated signal.

Optionally, in any one of the preceding aspects, the received transmission frame comprises a modulated signal at a fixed modulation rate.

Optionally, in any one of the preceding aspects, the method further comprising performing, by the node, forward-error-correction (FEC) decoding on the first modulation symbol after performing the combining.

Optionally, in any one of the preceding aspects, the method further comprising performing, by the node, forward-error-correction (FEC) decoding on the multiple modulation symbols after performing the combining.

Optionally, in any one of the preceding aspects, the header includes starting and ending locations of the one or more modulation symbols.

Optionally, in any one of the preceding aspects, the header is FEC encoded.

Optionally, in any one of the preceding aspects, the header is FEC encoded and repeated.

Optionally, in any one of the preceding aspects, the transmission frame comprises a continuous-mode time-division multiple access (TDMA) signal.

According to one other embodiment of the disclosure, there is provide node of a point-to-multipoint network, comprising a receiver configured to receive a transmission frame comprising a header including a repetition information and a data section comprising multiple modulation symbols, the data section including at least two repeated modulation symbols that are repeated to represent a first modulation symbol; and a data recovery stage coupled to the receiver and configured to: extract the repetition information of the header; quantify the amplitude of each modulation symbol of the at least two repeated modulation symbols; and combine the amplitudes of the at least two repeated modulation symbols, based on the repetition information, to reconstruct the first modulation symbol represented by the at least two repeated modulation symbols.

Optionally, in any one of the preceding aspects, the node comprising a point node in the point-to-multi-point communication network or comprising a multi-point node of a plurality of multi-point nodes in the point-to-multi-point communication network.

Optionally, in any one of the preceding aspects, the point-to-multi-point network comprises a passive optical network (PON), the transmission frame comprises an optical transmission frame, the point node comprises an optical line terminal (OLT), and the plurality of multi-point nodes comprise a plurality of optical network units (ONUs).

Optionally, in any one of the preceding aspects, the method further comprises performing, by the node, equalization on the two or more repeated modulation symbols before the combining.

Optionally, in any one of the preceding aspects, the combining comprising performing, by the node, soft addition of the amplitudes of the two or more repeated modulation symbols.

Optionally, in any one of the preceding aspects, the combining comprising performing, by the node, averaging of the amplitudes of the two or more repeated modulation symbols.

Optionally, in any one of the preceding aspects, the received signal comprises an on-off-keying (OOK) modulated signal.

Optionally, in any one of the preceding aspects, the received transmission frame comprises a modulated signal at a fixed modulation rate.

Optionally, in any one of the preceding aspects, the method further comprises the data recovery stage performing forward-error-correction (FEC) decoding on the first modulation symbol after performing the combining.

Optionally, in any one of the preceding aspects, the method further comprises the data recovery stage performing forward-error-correction (FEC) decoding on the multiple modulation symbols after performing the combining.

Optionally, in any one of the preceding aspects the header includes starting and ending locations of the one or more modulation symbols.

Optionally, in any one of the preceding aspects, the header is FEC encoded.

Optionally, in any one of the preceding aspects, the header is FEC encoded and repeated.

Optionally, in any one of the preceding aspects, the transmission frame comprises a continuous-mode time-division multiple access (TDMA) signal; and the receiver further comprises: a photodiode (PD) configured to convert the continuous-mode TDMA signal to an electrical signal or a radio frequency (RF) signal; an analog-to-digital converter (ADC) coupled to the PD and configured to convert the electrical signal or the RF signal to a digital signal; and the data recovery stage coupled to the ADC and configured to perform data recovery on at least a segment of the digital signal during each cycle of the point-to-multipoint network, and comprising a soft-addition stage configured to perform addition of amplitudes of repetitive symbols received in the downstream signal that are modulated with the repetition coding.

According to still another aspect of the disclosure, there is provided a communication method in a point-to-multi-point communication network, comprising generating, by a node, a transmission frame comprising a header and a data section comprising multiple modulation symbols; obtaining, by the node, a repetition information; repeating, by the node, at least one modulation symbol in the data section to create at least two repeated modulation symbols, with the at least two repeated modulation symbols being repeated according to the repetition information and to represent a first modulation symbol; adding, by the node, the repetition information to the header; and transmitting, by the node, the transmission frame.

Optionally, in any of the preceding claims, the node comprising a point node in the point-to-multi-point communication network or comprising a multi-point node of a plurality of multi-point nodes in the point-to-multi-point communication network.

Optionally, in any of the preceding claims, the point-to-multi-point network comprises a passive optical network (PON), the transmission frame comprises an optical transmission frame, the point node comprises an optical line terminal (OLT), and the plurality of multi-point nodes comprise a plurality of optical network units (ONUs).

Optionally, in any of the preceding claims, the method further comprising performing, by the node, forward error correction (FEC) encoding before the repeating.

Optionally, in any of the preceding claims, the transmission frame comprises an on-off-keying (OOK) modulated transmission frame.

Optionally, in any of the preceding claims, the transmission frame comprises a modulated transmission frame at a fixed modulation rate.

Optionally, in any of the preceding claims, the header includes starting and ending locations of the one or more modulation symbols.

Optionally, in any of the preceding claims, the method further comprising performing, by the node, FEC encoding on the header.

Optionally, in any of the preceding claims, the method further comprising performing, by the node, FEC encoding on the header and performing repeating on the header.

Optionally, in any of the preceding claims, the method further comprising performing by the node, FEC encoding on the header and the data section, with the data section being FEC encoded before the repeating, wherein a FEC encoding rate is configurable.

Optionally, in any of the preceding claims, the transmission frame comprises a continuous-mode time-division multiple access (TDMA) signal.

According to yet another aspect of the disclosure, there is provided a node of a point-to-multipoint network, comprising a data processing stage configured to: generate a transmission frame comprising a header and a data section comprising multiple modulation symbols; obtain a repetition information; repeat at least two modulation symbols in a data section comprising the multiple modulation symbols, with the repeating performed according to the repetition information and with the at least two modulation symbols being included in the data section and the multiple modulation symbols; add the repetition information to the header; and a transmitter coupled to the data processing stage and configured to transmit the transmission frame.

Optionally, in any one of the preceding aspects, the node comprising a point node in the point-to-multi-point communication network or comprising a multi-point node of a plurality of multi-point nodes in the point-to-multi-point communication network.

Optionally, in any one of the preceding aspects, the point-to-multi-point network comprises a passive optical network (PON), the transmission frame comprises an optical transmission frame, the point node comprises an optical line terminal (OLT), and the plurality of multi-point nodes comprise a plurality of optical network units (ONUs).

Optionally, in any one of the preceding aspects, the method further comprises the data processing stage performing, by the node, forward error correction (FEC) encoding before performing the repeating.

Optionally, in any one of the preceding aspects, the transmission frame comprises an on-off-keying (OOK) modulated signal.

Optionally, in any one of the preceding aspects, the transmission frame comprises a modulated signal at a fixed modulation rate.

Optionally, in any one of the preceding aspects, the header includes starting and ending locations of the one or more modulation symbols.

Optionally, in any one of the preceding aspects, the method further comprises the data processing stage performing FEC encoding on the header.

Optionally, in any one of the preceding aspects, the method further comprises the data processing stage performing FEC encoding on the header and performing repeating on the header.

Optionally, in any one of the preceding aspects, the method further comprises the data processing stage performing FEC encoding on the header and the data section, with the data section being FEC encoded before the repeating.

Optionally, in any one of the preceding aspects, the method further comprises the data processing stage performing FEC encoding on the header and the data section, with the data section being FEC encoded before the repeating, wherein a FEC encoding rate is configurable.

Optionally, in any one of the preceding aspects, the transmission frame comprises a continuous-mode time-division multiple access (TDMA) signal.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

DETAILED DESCRIPTION

Figure 1:
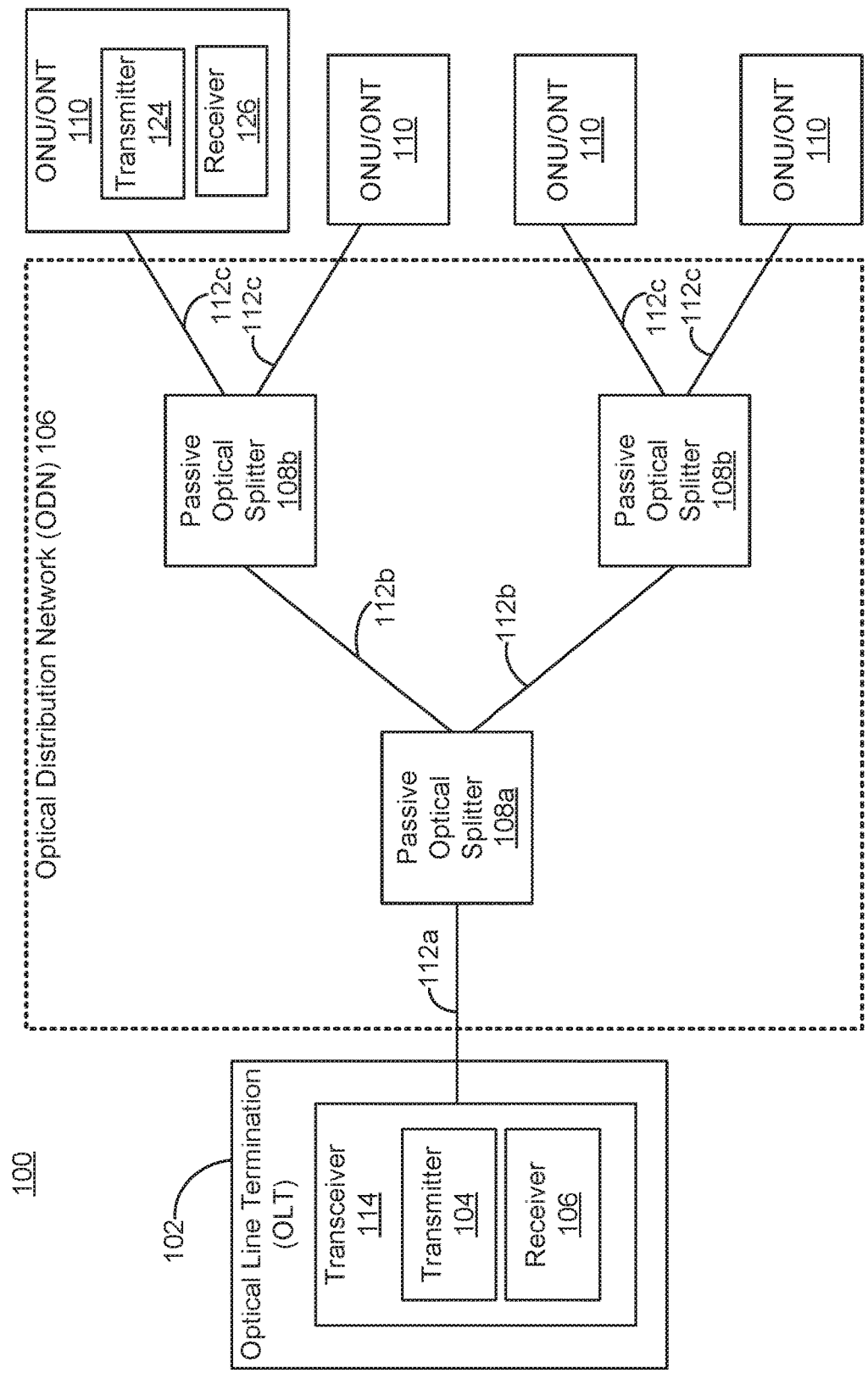
FIG. 1 illustrates an example passive optical network (PON) system in which embodiments may be practiced.

The present disclosure will now be described with reference to the figures, which in general relate to providing a simplified and flexible network that accommodates network connections across a wide range of power budgets.

A point-to-multipoint system uses repetition coding, with soft-addition, to coarsely adjust a net data rate realized in a given point node to multipoint node connection. This configuration permits the point-to-multipoint system to meet individual power budget requirements of a given point node to multipoint node pair.

Repetition coding refers to repeating a bit multiple times, such as three times per bit. The receiving device then decides what the intended bit value was by viewing the three bits as a majority vote. The coding in this example features a repetition code of block-length three and rate one-third, so three times as many bits per second are used to transmit the same signal as are used by an uncoded message or bitstream. Soft-addition comprises addition of the amplitudes of repetitive symbols received in a signal that are modulated with repetition coding.

The point-to-multipoint system, which may include a passive optical network (PON), has at least one optical network unit (ONU) in communication with an optical line terminal (OLT). Data communicated by the OLT to an ONU or ONUs is formulated with a repetition code, wherein soft addition decoding is applied to recover the data at the ONU or receiving device. The OLT modulates downstream signals, using on-off key (OOK) modulation, at a fixed rate. The OLT transmits the OOK modulated signal to the individual ONUs. The ONUs parse the repetition code to both determine whether to decode the downstream signal using soft addition decoding, and to determine the amount of repetition that was used in the repetition encoding.

In some embodiments, the point-to-multipoint system comprises communications among a point node and a plurality of multipoint nodes, wherein at least one point node to multipoint node connection is configured to use soft addition decoding and at least one point node to multipoint node connection is configured not to use soft addition decoding (e.g., repetition code is set to "0"). An example embodiment of a point-to-multipoint system comprises an OLT in communication with one or more ONUs in a PON.

In one embodiment, the point-to-multipoint system uses forward error correction (FEC) coding with different overheads or rates. In this way, the point-to-multipoint system may finely adjust the net data rate and thus tailor the power budget to meet the requirements of a given point node to multipoint node connection.

In another embodiment, the point-to-multipoint system modulates data using on-off key (OOK) modulation. In one embodiment, the point-to-multipoint system transmits a modulated signal at a fixed rate or modulation speed (e.g., 50 Gb/s).

In one other embodiment, a point node of the point-to-multipoint system passes information about the repetition coding between the point node and each of the multipoint nodes. For example, the point node may pass the information in payload signal segments. In some embodiments, a media access controller (MAC) passes the information about the repetition code to a receiver in the multipoint node. The multipoint node performs the appropriate soft-addition. In some embodiments, the multipoint node performs the soft-addition after equalization and before FEC decoding.

Thus, embodiments disclosed herein provide for methods, apparatus and systems to support flexible power budgets by using an OOK modulation format to thereby achieve high performance using transmitter and receiver implementations less complex than PAM receiver implementations. As the modulation format and symbol rate, as well receiver sampling rate, remain constant, different net data rates may be realized during processing at the receiver since the optional soft addition decoding is implemented after the signal is converted from analog to digital. Thus, the methods, apparatus and systems disclosed herein provide for a flexible point-to-multipoint without any receiver front-end changes. In some embodiments, described fully below, the methods, apparatus and systems are configured to provide a simplified flexible PON.

FIG. 1 illustrates an example passive optical network (PON) system 100 in which embodiments may be practiced. PON technology is an optical access technology developed to support point-to-multipoint applications. As shown in FIG. 1, a PON system 100 includes three parts: an Optical Line Termination (OLT) 102, an Optical Distribution Network (ODN) 106, and at least one Optical Network Unit (ONU)/Optical Network Termination (ONT) 110. The OLT 102 may reside in a central office (CO). The ONU/ONTs 110 may reside in or near user premises. The ODN 106 comprises optical fiber 112 (which is shown in FIG. 1 as including fiber elements 112a, 112b, and 112c, discussed below), and passive optical splitters 108a, 108b. The ODN 106 is located between the OLT 102 and ONU/ONTs 110. Optical fiber provides significantly improved bandwidth capacity over technologies such as copper cable and wireless Local Area Networks (LANs). The PON 100 may be used to transmit a wide range of data including, but not limited to, data access services, voice service, digital video service such as internet protocol television (IPTV), video on demand, conventional video services such as cable television and digital television, security data, and utility meter reading links to residential users.

The OLT 102 provides a network side interface for the PON system 100, and is connected to one or more ODNs 106. The OLT 102 includes a transceiver 114 that has a transmitter 104 used to transmit an optical signal into the ODN 106, as well as a receiver 126 used to receive an optical signal from the ODN 106. Thus, the PON 100 is capable of bi-directional data transfer. A link from the OLT 102 to the ONU/ONTs 110 is referred to as a downlink, and a link from an ONU/ONT 110 to the OLT 102 is referred to as an uplink.

The same optical fiber can be used to for the uplink and the downlink. In one embodiment, the PON system uses wavelength division multiplexing (WDM), using one wavelength for downstream traffic and another for upstream traffic. In one embodiment, downstream traffic uses the 1342 nanometer (nm) wavelength. However, other wavelengths may be used for downstream traffic. In one embodiment, the PON system 100 uses the 1278 nanometer (nm) wavelength for upstream traffic. In one embodiment, the PON system 100 uses the 1310 nanometer (nm) wavelength for upstream traffic. However, other wavelengths may be used for upstream traffic.

The ODN 106 includes passive optical splitters 108a, 108b and optical fiber 112, as noted above. The optical fiber includes feed fiber 112a, which optically connects the OLT 102 to passive optical splitter 108a; distribute fiber 112b, which optically connects the passive optical splitter 108a to passive optical splitters 108b, and drop fiber 112c, which optically connects the passive optical splitters 108b to the ONU/ONTs 110. The distribution fiber 112b and the drop fiber 112c may be collectively referred to as branch fibers, or individually as a branch fiber. The reference numeral 112 may be used to refer to optical fiber when not referring specifically to feed fiber 112a, distribute fiber 112b, or drop fiber 112c. The passive optical splitters 108 may be configured to route the optical signal from the OLT 102 to the ONU/ONT 110. For example, passive optical splitter 108a may receive the optical signal from feed fiber 112a and divide the power of the optical signal onto each of the distribute fibers 112b. Passive optical splitters 108b may receive the optical signal from distribute fibers 112b and divide the power of the optical signal onto the drop fibers 112c. The passive optical splitters 108 may split the optical signal into more than two signals. FIG. 1 is a structural diagram of an ODN 106 with level-2 splitting. However, there could be more or fewer levels of splitting. The ODN 106 is one example of an optical fiber network.

The ONU/ONTs 110 terminate the PON 100 and may provide an interface to customer equipment (not depicted in FIG. 1). An ONU/ONT 110 contains a receiver 126 that is configured to receive and process the optical signal from the ODN 106. An ONU/ONT 110 may optionally contain a transmitter 124 that is configured to transmit an optical signal into the ODN 106. For example, ONU/ONT 110 may convert between optical signals (to/from ODN 106) and electrical signals (from/to customer equipment). An ONU/ONT 110 may be bridged to customer equipment using technologies such as Ethernet, phone lines, coaxial cables, Wi-Fi, etc.

Figure 2:
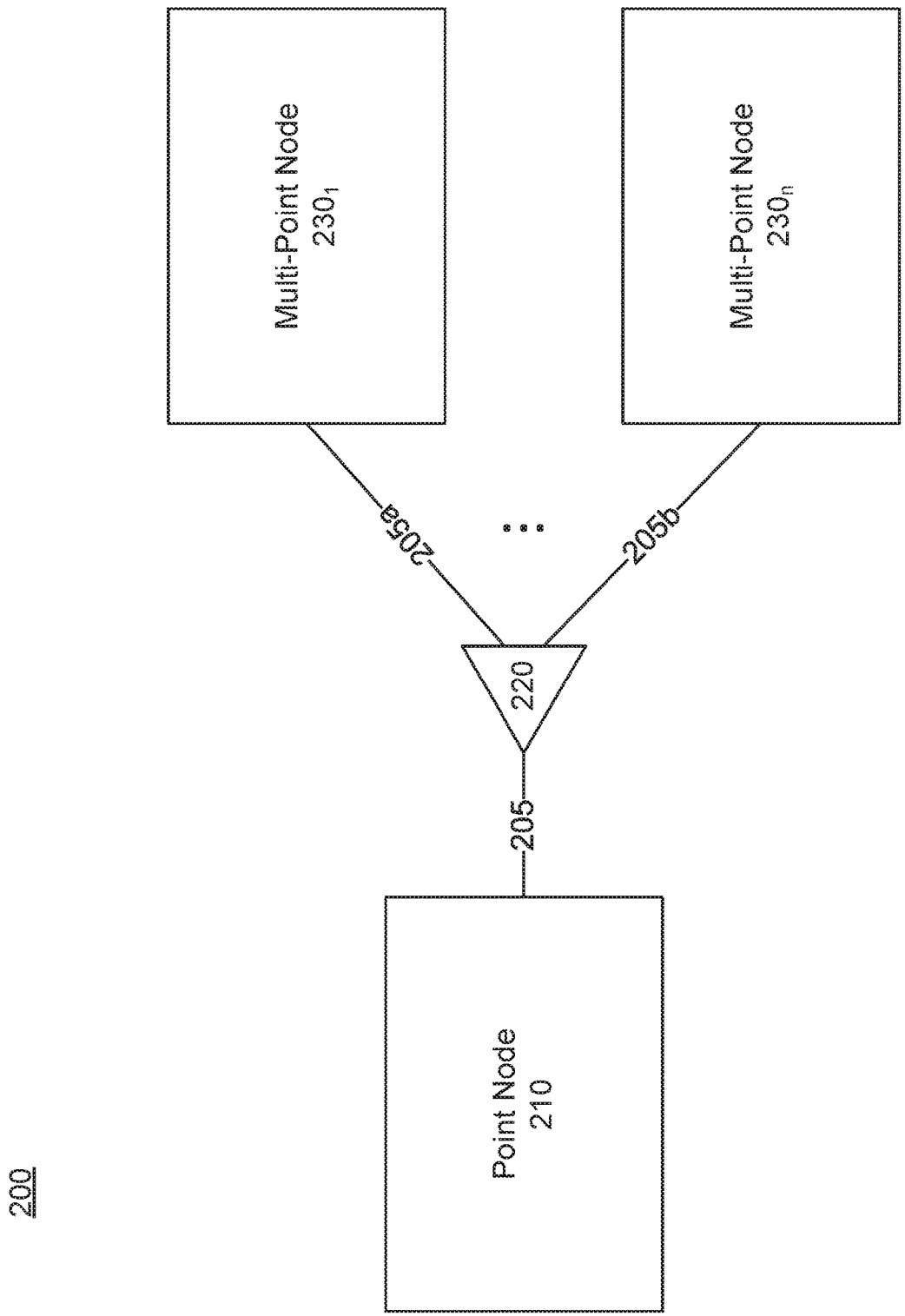
FIG. 2 is a block diagram illustrating an exemplary point-to-multipoint network.

FIG. 2 is a block diagram illustrating an exemplary point-to-multipoint network as part of the ODN 106 of FIG. 1. As shown, a point-to-multipoint network 200 includes point node 210, coupled, through splitter 220, to a plurality of multipoint nodes, labeled as multipoint node $230_1$ and multipoint node $230_n$. In some embodiments, the point-to-multipoint network 200 is a bi-directional transmission system. In some embodiments, the point node 210 may be in communication with a wide area network (WAN) that receives content, such as content from the Internet. In these embodiments, the multipoint nodes $230_1$ and $230_n$ may be located at users' homes, allowing the users to connect to the Internet through the point-to-multipoint network 200.

In a downstream direction, the point node 210 transmits a downstream signal over a communications medium (e.g., fiber), intended for one of the multipoint nodes $230_1$ and $230_n$. The downstream signals are multiplexed on the transmission medium 205 and then split at splitter 220. In this way, each multipoint node $230_1$ and $230_n$ receives the downstream signal via transmission mediums 205a and 205b for each of the other multipoint nodes $230_1$ and $230_n$. As described more fully below, the multipoint nodes $230_1$ and $230_n$ de-multiplex the downstream signal to extract the portion of the downstream signal intended for a specific multipoint node $230_1$ and $230_n$.

The point-to-multipoint network 200 also supports transmission of data in the upstream direction (e.g., transmission of data from multipoint nodes (users) to the point node for access to a WAN, such as the Internet). For the upstream direction, the multipoint nodes $230_1$ and $230_n$ modulate an upstream signal on the transmission medium 205a and 205b. The upstream signal is combined in splitter 220 and transmitted to the point node 210.

In one embodiment, a flexible net data rate may be employed. The point node 210 passes information (e.g., control and management bits (CMB)) to the multipoint nodes $230_1$ and $230_n$, so that the appropriate discovery techniques can be used to recover data at a net data rate that optimizes performance of the individual point-to-multipoint connection.

The point node 210 employs techniques, as described below, that permit flexible course adjustment of the net data rate to be realized in specific point-to-multipoint connections. Thus, point node 210 comprises circuits and implements techniques to permit flexibly setting the net data rate suitable for an individual (or a group) point-to-multipoint connection, and therefore tailors the net date rate in accordance with the power budget requirements imposed from the individual point-to-multipoint connection.

In some embodiments, the point node 210 uses FEC coding to achieve additional flexibility by fine tune net data rates for specific point-to-multipoint connections. In this way, the point node 210 finely adjusts the net data rate between individual point-to-multipoint connections, and thus optimally tunes net data rates to achieve a high quality BER while meeting the power budget requirements for a given point-to-multipoint pair.

In some embodiments, the point-to-multipoint network 100, shown in FIG. 1, constitutes a passive optical network (PON) system.

Figure 3A:
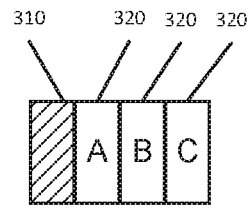
FIG. 3A shows a typical transmission frame for transmitting an optical signal.

FIG. 3A shows a conventional transmission frame 300 for transmitting an optical signal. The frame 300 includes a header 310 and three modulation symbols 320. The header 310 and the modulation symbols 320 are transmitted at a fixed modulation rate.

Figure 3B:
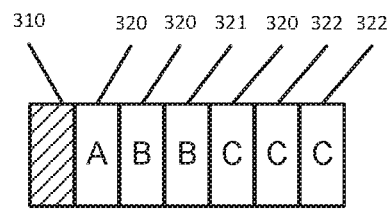
FIG. 3B shows a transmission frame according to an embodiment.

FIG. 3B shows a transmission frame 350 according to an embodiment. The transmission frame 350 includes a header 310 and three modulation symbols 320. However, in the transmission frame 350, the first modulation symbol A 320 occurs only once, the second modulation symbol B 320 includes one repeated modulation symbol B 321, and the third modulation symbol C 320 includes two repeated modulation symbols C 322.

By repeating a modulation symbol, the transmitting device gives more transmission power to the repeated modulation symbol. By repeating the repeated modulation symbol, the transmitting device increases the probability that the symbol will be correctly received, despite any ambient noise in the transmission medium or despite any inter-symbol interference (ISI) during transmission.

The transmission frame 350 according to any of the embodiments comprises a modulated optical signal. The modulated optical signal can comprise a downstream transmission or an upstream transmission. A modulation symbol in any of the embodiments comprises an analog light waveform having a modulated amplitude. The power inherent in the modulation symbol may depend on its modulation. For example, where the transmission frame 350 is modulated using an on-off keying (OOK) modulation, different waveforms may represent logical "on" and "off" values.

In addition to repeating at least some of the modulation symbols, the multiple modulation symbols of the transmission frame 350 can also be encoded for transmission. For example, in some embodiments, one or both of the header 310 and the modulation symbols 320 of the transmission frame 350 can be forward error correction (FEC) encoded, according to any suitable FEC encoding scheme.

In some embodiments, the transmission frame 350 is first FEC encoded, then one or more modulation symbols of the transmission frame 350 are repeated, as discussed above. When the transmission frame 350 has been transmitted, the receiving device or devices must first recover any original modulation symbols in the frame 350, and then must perform FEC decoding, as applicable.

A device receiving the transmission frame 350 will need to process the repeated modulation symbols to recover the original modulation symbol B or C 320. The receiving device can use the power in the repeated modulation symbols to generate and recover the original modulation symbol, even where a modulation symbol (or a repeated modulation symbol) has been corrupted or lost during transmission. The power in the repeated modulation symbols can be combined in some manner in order to determine and recover the original modulation symbol. The power in the repeated modulation symbols can be combined in some manner and compared to a threshold or thresholds in order to determine and recover the original modulation symbol. In the example transmission frame 350, all three modulation symbols B (320 and 322) are combined and compared to a threshold or thresholds to determine the original modulation symbol B.

In some embodiments, the amplitudes of the repeated modulation symbols are averaged to combine them and reconstruct the original modulation symbols. In some embodiments, the amplitudes of the repeated modulation symbols are recovered and then combined using soft addition, where the signal amplitudes are added, and the additive amount is used to determine what the final result should be. In soft addition, the additive amount may or may not reflect the final determined modulation symbol. For example, the additive amount can be compared to a threshold or thresholds, wherein the threshold or thresholds are used to determine if the modulation symbol comprises symbol B or C, for example. It should be understood that other suitable combination methods can be used to combine a repeated modulation symbol, and are within the scope of the claims and disclosure.

Figure 4:
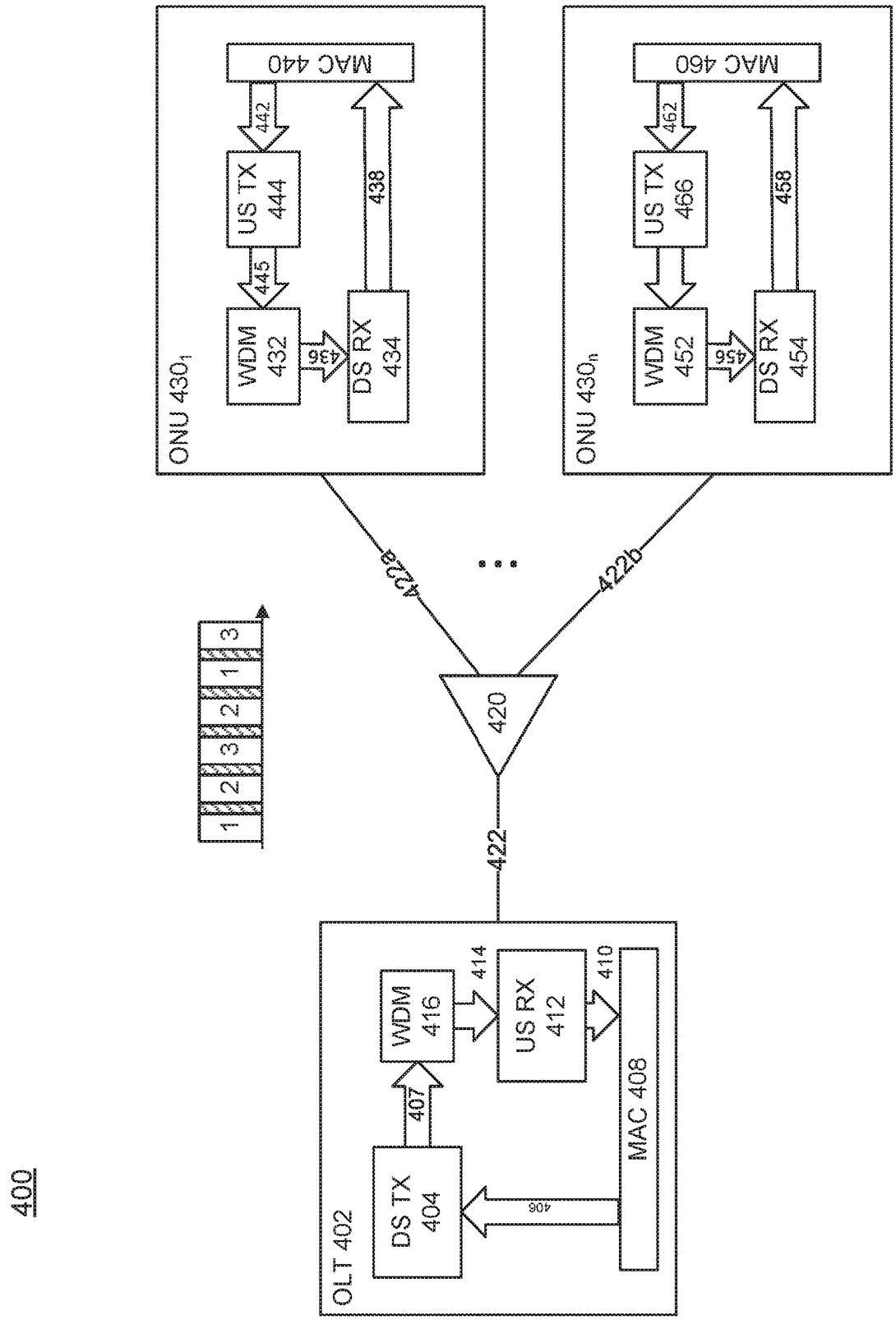
FIG. 4 is a block diagram illustrating one embodiment of a PON system.

FIG. 4 is a block diagram illustrating one embodiment of a flexible-PON system. In the flexible-PON system 400, the point node 402 comprises OLT 402, and the multipoint nodes comprise ONUs $430_1$ and $430_n$. In one embodiment of the PON system, the upstream and downstream signals comprise optical signals transmitted over the fiber optic medium 422. In the PON system of FIG. 2, upstream and downstream signals (e.g., signals 1, 2 and 3) are communicated across fiber optics medium 422 (i.e., 422a and 422b), and divided/combined through splitter 420. In the illustrated embodiment, the optical signals 1, 2 and 3 are shown with payloads (labeled 1, 2 or 3) and headers (greyed boxes following the payload).

OLT 402 is configured as a bidirectional point node such that downstream signals, generated by downstream transmitter (DS TX) 404, may be transmitted and upstream signals may be received and demodulated in upstream receiver (US RX) 412. Specifically, the downstream transmitter 404 receives payload data, across bus 406, from media access controller (MAC) 408. In some embodiments, the payload data constitutes content acquired from the Internet for delivery to the end users. The downstream transmitter 404 modulates frames (e.g., payload and control data) in accordance with the standards and techniques employed by the PON system 400. In some embodiments, the downstream transmitter 404 modulates the frame data using on-off keying (OOK) techniques. The wavelength division multiplexer (WDM) 416 receives downstream signals from downstream transmitter (DS TX) 404 over line 407 and multiplexes multiple downstream signals, intended for specific ONUs 430$_1$ and 430$_n$, for transmission of a single downstream signal on the fiber optics medium 422.

To process upstream communications, the WDM 416 receives the upstream signal on the fiber optics medium 422 via lines 422a and/or 422b, de-multiplexes the upstream signals, and inputs the upstream signals to the upstream receiver 412 through bus 414. In general, the upstream receiver 412 demodulates the upstream signal and recovers data in accordance with the flexible-PON. In some embodiments, the upstream receiver 412 demodulates the upstream signals from the ONUs 430$_1$ and 430$_n$ using time division multiple access (TDMA) techniques, as well as demodulating the OOK modulated signal. As shown in the figure, the upstream receiver 412 communicates with the MAC 408 through bus 410.

In some embodiments, the upstream receiver 412 is configured to process upstream signals, originating from one or more ONUs (430$_1$ and 430$_n$, in a burst-mode time-division multiple access (TDMA) format. The upstream receiver 412 comprises a photodiode (not shown), configured to convert the burst-mode TDMA upstream signal to an electrical signal or a radio frequency (RF) signal, and an analog-to-digital converter (ADC) (not shown), coupled to the photodiode (PD), to convert the electrical signal or the RF signal to a digital signal. The upstream receiver 412 also comprises a burst-mode data recovery stage, coupled to the ADC (not shown), and configured to perform data recovery on a segment of the digital signal corresponding to each ONU 430$_1$ and 430$_n$ during each PON cycle time. That is, data from the ONUs 430$_1$ and 430$_n$ are time multiplexed on the upstream signal. During burst-mode, each ONU 430$_1$ and 430$_n$ transmits data on its burst cycle. Thus, during each PON cycle, the upstream receiver processes data from one of the ONUs 430$_1$ and 430$_n$ (one at a time). In addition, the burst-mode data recovery stage comprises a soft-addition stage configured to perform addition of the amplitudes of the received repetitive symbols that are modulated with repetition coding.

The downstream transmitter 404 employs techniques that permit flexible course adjustment of the net data rate realized in specific OLT-ONU connections. In this way, these circuits and techniques permit flexibly setting the net data rate suitable for an individual OLT-ONU connection, and therefore tailor the net data rate in accordance with the power budget requirements imposed from the individual OLT-ONU connections, thus implementing a flexible PON.

As described more fully below, in some embodiments, the OLT 402 passes information about the repetition coding for each TDMA segment between MAC 408 and the downstream receivers 434 and 454 at ONUs 430$_1$ and 430$_n$.

In some embodiments, the OLT 402 passes information (e.g., control and management bits (CMBs)) to the downstream receivers 434 and 454, so that appropriate discovery techniques can be used to recover data at a net data rate that optimizes performance of the individual OLT-ONU connection. In alternative embodiments, the MAC 408 (as opposed to the transmitter) adds the ONU-specific soft addition in order to simplify transmitter design (e.g., the transmitter receives the payload data with the soft addition), explained further below with reference to the various embodiments.

Payload signal segments may be received at OLT 402. In some embodiments, the MAC 408 of the OLT 402 is configured to provide information about FEC encoding used for each payload signal segment. In some embodiments, the forward-error-correction (FEC) decoding is based on soft-decision (SD) decoding. In some embodiments, information about the FEC encoding used is encoded in a header that is attached to each payload signal segment. In some embodiments, in ONUs 430$_1$ and 430$_n$, information about repetition coding is decoded from the header that is attached to each payload signal segment. The downstream transmitter 404 uses the FEC coding to achieve additional flexibility by fine-tuning FEC overheads and thus net data rates for specific OLT-ONU connections (e.g., OLT 402 connected to ONU 430$_n$ via splitter 420). The fine-tuning of FEC overhead may be realized with the same FEC mother code but different shortening of payload bits and puncturing of parity bit schemes. In this way, the OLT 402 may finely adjust the net data rate between individual OLT-ONU connections, and thus optimally tune net data rates to achieve high quality BERs while meeting the power budget requirements for a given OLT-ONU pair.

The ONUs 430$_1$ and 430$_n$ receive, as input, multiplexed downstream signals, and recover payload data using the flexible-PON disclosed herein, including implementing, on the receiver side, the net data rate set for the respective OLT-ONU connection.

In this embodiment, ONUs 430$_1$ and 430$_n$ comprise WDMs 432 and 452 that de-multiplex the optical signal received from OLT 402 via fiber optics 422a and 422b, and extract the ONU-specific downstream signal. The downstream receivers 434 and 456 modulate and recover the data frame modulated on the optical signal. As described more fully below, the downstream receivers 434 and 454 implement the flexible-PON techniques to adjust the net data rate. In other embodiments, the recovered data payload, extracted from the frame, is transmitted to the MACs 440 and 460 on buses 438 and 458.

In one embodiment, the upstream transmitters 444 and 466 receive data from the MACs 440 and 460, formulate the frame with the data, and modulate the data (e.g., using OOK modulation and TDMA techniques) to create an upstream signal, and modulate the upstream signal on an optical signal suitable for optical transmission. In addition, the optical signal is input to the WDMs 432 and 452 via link 445 and then multiplexed, using WDMs 432 and 452 for transmission on the fiber optics 422 to the OLT 402.

Figure 5:
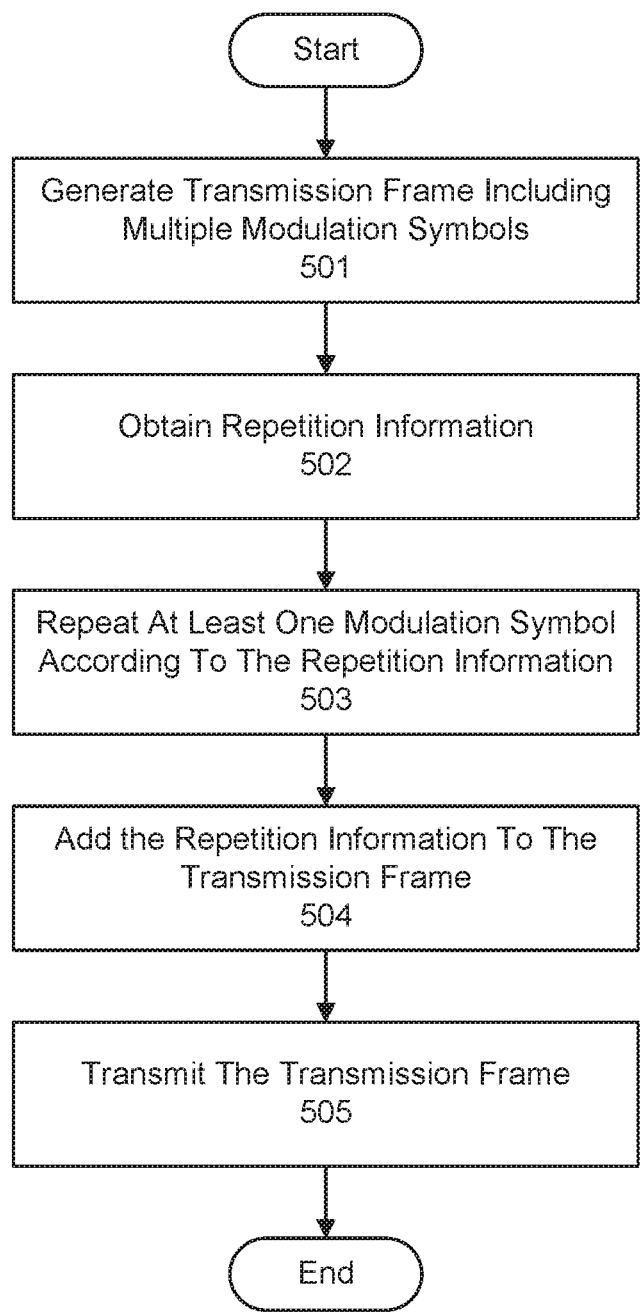
FIG. 5 is a flowchart of a communication method in a point-to-multi-point communication network according to an embodiment.

FIG. 5 is a flowchart 500 of a communication method in a point-to-multi-point communication network according to an embodiment. The flowchart 500 shows actions or operations performed by a point node of the point-to-multi-point communication network. The communication comprises the point node transmitting a transmission frame as part of transmitting an optical signal. It should be understood that the point node can transmit the transmission frame during an upstream transmission or during a downstream transmission. It should be further understood that the transmission frame may be one of multiple transmission frames being transmitted by the point node. In some embodiments, the point node comprises an OLT, such as the OLT 402 of FIG. 4.

In step 501, the point node generates the transmission frame. The transmission frame in some embodiments comprises a header and a data section comprising multiple modulation symbols.

In step 502, the point node obtains repetition information. The repetition information comprises information for repeating modulation symbols in the transmission frame. The repetition information in some embodiments includes information comprising the modulation symbol or symbols to be repeated in the transmission frame. The repetition information in some embodiments includes information comprising the number of times a modulation symbol should be repeated in the transmission frame.

In step 503, the point node repeats at least one modulation symbol in the data section of the transmission frame. The point node repeats the at least one modulation symbol according to the obtained repetition information. It should be understood that more than one modulation symbol in the transmission frame can be repeated. It should be understood that different modulation symbols in the transmission frame can be repeated different numbers of times (see symbols B and C in FIG. 3B, for example).

In step 504, the repetition information is added to the transmission frame. In some embodiments, the repetition information is added to the header of the transmission frame.

In step 505, the transmission frame is transmitted by the point node. As previously discussed, the transmission frame can be transmitted in a downstream direction or in an upstream direction. In some examples, the transmission frame is transmitted to one or more multi-point nodes. In some examples, the point node comprises an OLT and the transmission frame is transmitted to one or more ONUs.

Figure 6:
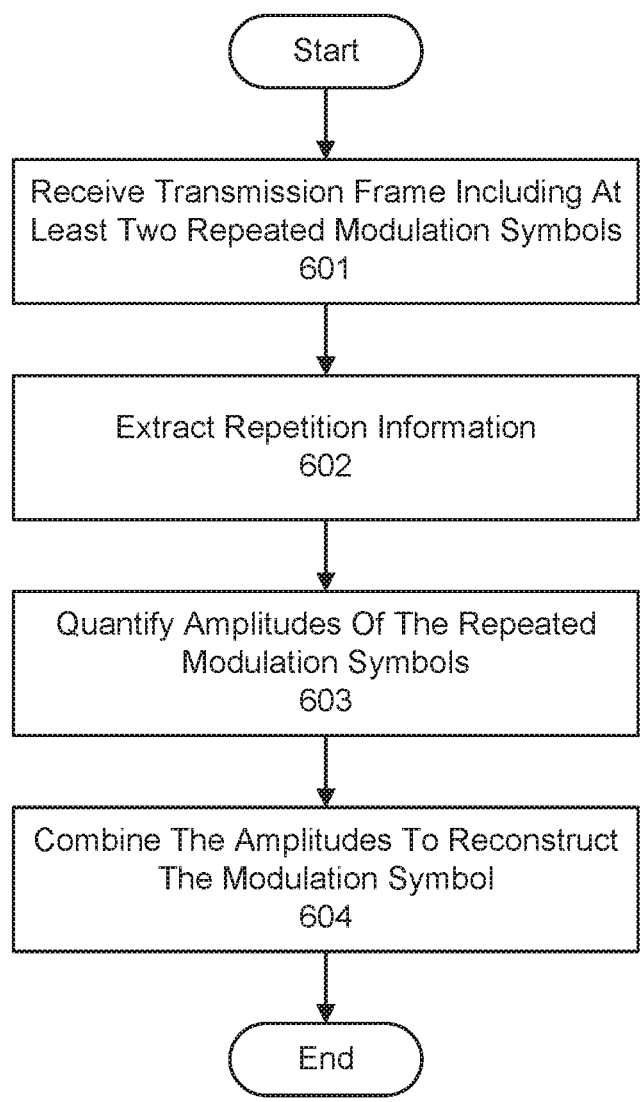
FIG. 6 is a flowchart of a communication method in a point-to-multi-point communication network according to an embodiment.

FIG. 6 is a flowchart 600 of a communication method in a point-to-multi-point communication network according to an embodiment. The flowchart 600 shows actions or operations performed by a multi-point node of the point-to-multi-point communication network. The communication comprises the multi-point node receiving a transmission frame as part of transmitting an optical signal. It should be understood that the multi-point node can receive the transmission frame during an upstream transmission or during a downstream transmission. It should be further understood that the transmission frame may be one of multiple multi-point nodes receiving the transmission frame. In some embodiments, the multi-point node comprises an ONU, such as an ONU 330 of FIG. 4.

In step 601, the multi-point node receives a transmission frame including at least two repeated modulation symbols. The transmission frame in some embodiments comprises a header and a data section comprising multiple modulation symbols.

In step 602, the multi-point node extracts repetition information from the received transmission frame. In some embodiments, the multi-point node extracts the repetition information from a header of the received transmission frame.

In step 603, the multi-point node quantifies the amplitudes of the repeated modulation symbols. The amplitudes are quantified in preparation for the following step. The amplitudes of all modulation symbol occurrences of a particular modulation symbol are quantified.

In step 604, the multi-point node combines the amplitudes to reconstruct the modulation symbol. The amplitudes are combined to reconstruct the original modulation symbol as the original modulation symbol was before transmission to the multi-point node. By combining the amplitudes of the repeated modulation symbols, the multi-point node can more accurately determine the original modulation symbol, even in the presence of noise or other errors.

Figure 7:
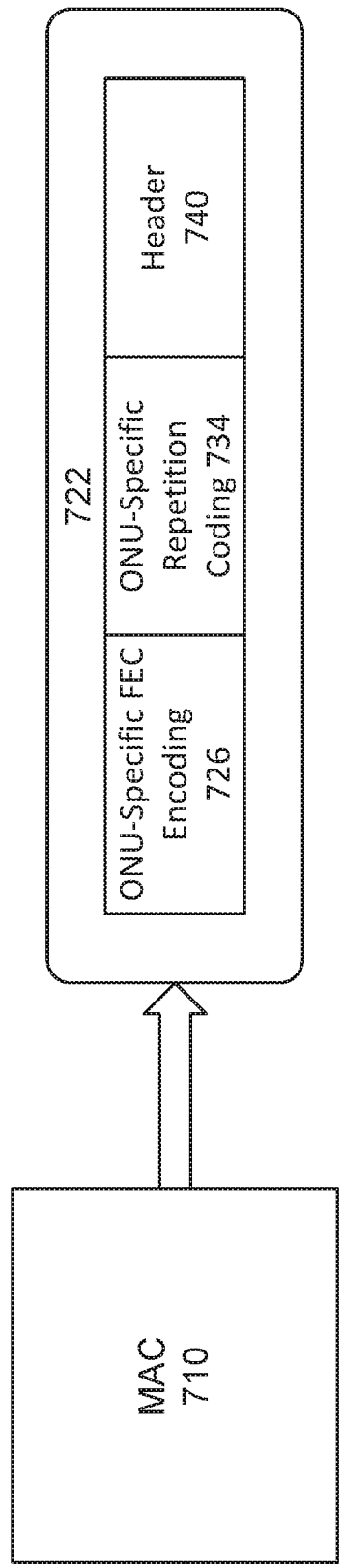
FIG. 7 diagrammatically illustrates one embodiment for frame formation.

FIG. 7 diagrammatically illustrates one embodiment for frame formation in accordance with the flexible-PON techniques disclosed herein. In the illustrated embodiment, frame 722 includes ONU-specific FEC encoding 43204, ONU-specific repetition coding 730 and a header 740. For example, FEC codes may be used to improve communication reliability and increase power link budgets. The basic operation of an FEC scheme involves adding redundancy bytes (e.g., parity bits) to data using a code. The redundancy of FEC allows receivers in the PON 400 to detect and correct errors in transmitted data (e.g., introduced via the link, transmitter, receiver, storage medium, or the like), thereby avoiding the need for data retransmissions. The PON 400 may implement any suitable type of FEC scheme such as Reed-Solomon (RS), Bose-Chaudhuri-Hocquenghem (BCH), low-density parity-check (LDPC) coding, binary convolutional code (BCC), or the like.

In general, the point node (e.g., OLT 402) receives information (e.g., repetition code information) regarding the flexible net data rate specific to the point-to-multipoint connection (i.e., OLT-ONU connection). To this end, the point node (e.g., OLT 402) receives the course tuning net data rate via the ONU-specific repetition coding 734, as well as the fine tuning of the net data rate via the ONU-specific FEC encoding 42620.

In operation, the point node (e.g., OLT 402) formulates a header 740 based on the ONU-specific repetition coding 734 and the ONU-specific FEC encoding 736. The header may be inserted into the frame 722 along with the payload data received from MAC 710 (which may be, for example, MAC 440 or 460 in FIG. 4). Embodiments for formulating headers for insertion into the frame are described more fully below.

Figure 8A:
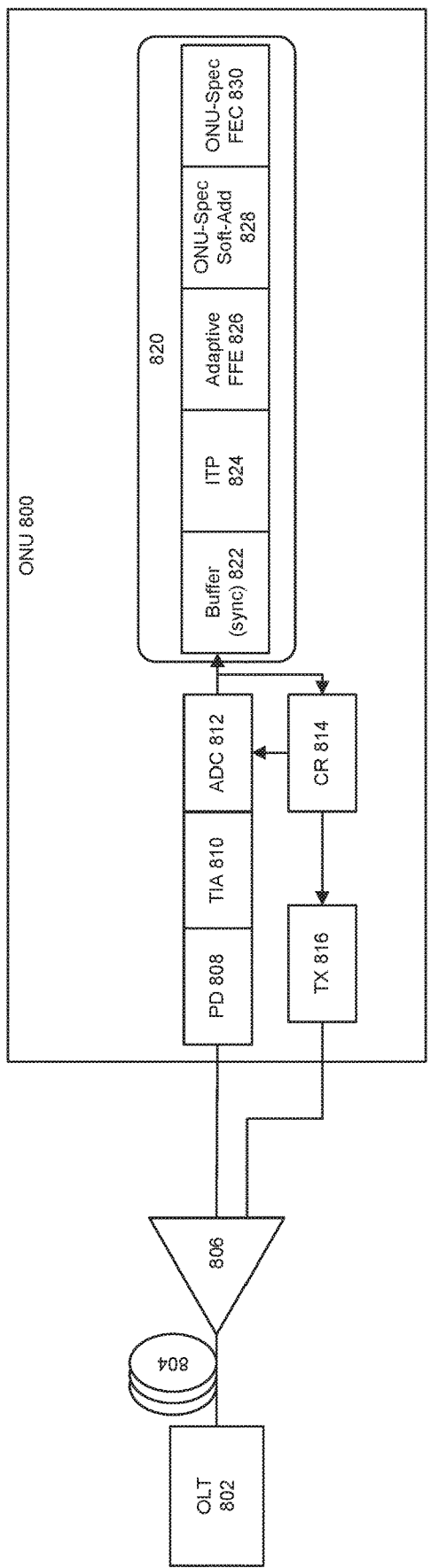
FIGS. 8A and 8B illustrate embodiments for a downstream receiver in an ONU.

FIG. 8A illustrates an embodiment of a downstream receiver in an ONU. As illustrated, OLT 802 transmits a signal on fiber optics 804 that is routed to each ONU (e.g., ONU 800), which may be, for example, ONU $430_1$ and $430_n$, through splitter 806. A phase detector (PD) 808, in the downstream receiver, receives the OLT-ONU specific downstream signal and converts the signal to an electrical or radio frequency (RF) signal for input to transimpedance amplifier (TIA) 810. In one embodiment, the TIA 810 is a current to voltage converter, which conditions and amplifies the output of the PD 808 for input to the analog to digital converter (ADC) 812. The ADC 812 samples the downstream signal to create a sampled signal for input to the buffer 822 (i.e., a raw sampled signal prior to quantization into digital data) and to a continuous mode receiver (CR) 814. The signal received at the CR 814 is also passed to the transmitter (TX) 816 for transmission.

In some embodiments, the downstream receiver 800 is configured to process, in continuous mode, time-division multiple access (TDMA) modulated downstream signals. In this embodiment, PD 808 converts the continuous-mode TDMA downstream signal to an electrical signal or a radio frequency (RF) signal. The ADC 812 converts the electrical signal or the RF signal to a digital signal. A data recovery stage 820 performs data recovery on a segment of the digital signal corresponding to ONU 800 during each PON cycle time. The ONU-Specific Soft-Addition 828 performs addition of the amplitudes of the received repetitive data (e.g., symbols) that are modulated with repetition coding.

In some embodiments, the multipoint node (e.g., ONU 402) is operated in continuous mode for the downstream signal. In the upstream, burst mode (PR) and adaptive equalization (EQ) are performed on the upstream signals intended for a specific ONU. In some embodiments, the initial EQ coefficients are pre-stored, and the pre-stored EQ coefficients are uploaded on a burst-by-burst basis.

The sampled signal is input to buffer 822, where the data stream is time-aligned or synchronized based on headers received in the payload data. The synchronized streams are input to interpolator (ITP) 824. Subsequently, the receiver performs adaptive FFE at 826.

The data recovery stage 820 performs the ONU-specific soft addition when the repetition code of a TDMA signal segment indicates that the data was transmitted with repetition. In one embodiment, the number of repetitions is also included. The repetition code information from the TDMA segment, in one embodiment, is used to perform the soft-addition after equalization and before FEC decoding. Finally, the ONU-specific FEC 830 is performed based on the specific FEC coding set for the OLT-ONU connection. For example, one ONU may use FEC with a code rate of 0.8 while another ONU may use FEC with a code rate of 0.9.

Figure 8B:
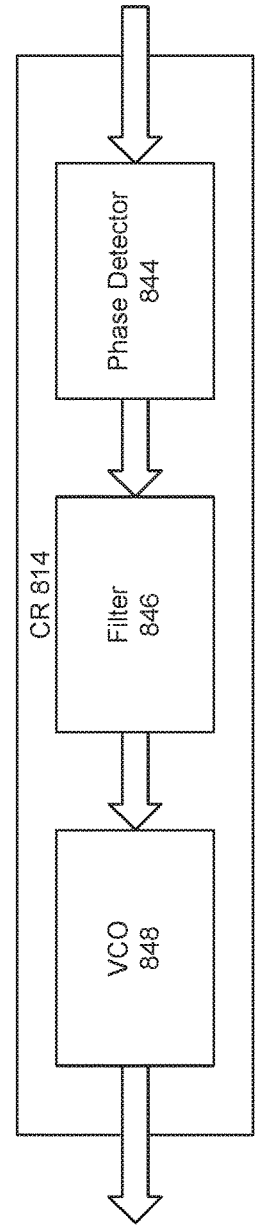

FIG. 8B illustrates one embodiment of a continuous mode receiver. In one embodiment, the continuous mode receiver (CR) 814 includes a phase detector 844, a filter 846 and a voltage-controlled oscillator (VCO) 848. The CR 814 is configured to recover the clock used during clock synchronization. As shown in related FIG. 8A, the CR 814 is coupled to TX 816 for transmission of the clock across the PON network 100 (FIG. 1).

Figure 9A:
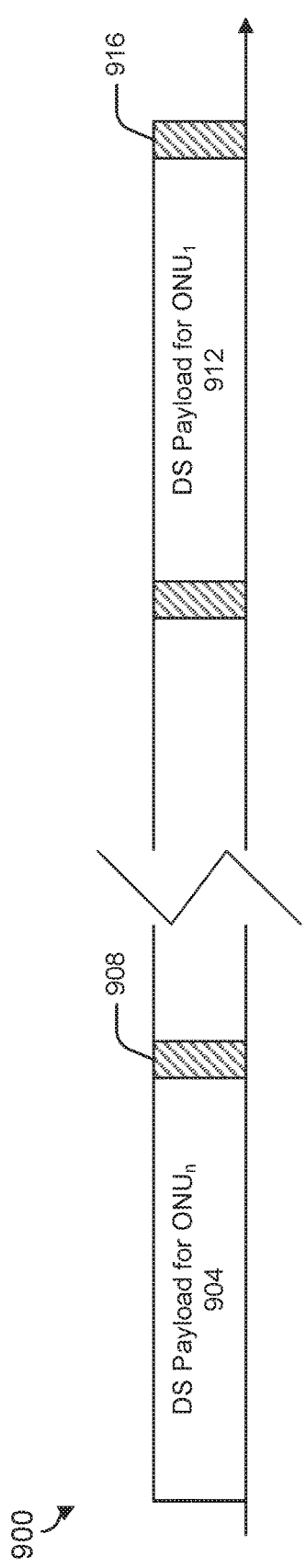
FIGS. 9A and 9B illustrate embodiments of frame structures for insertion into downstream and upstream signals.
Figure 9B:
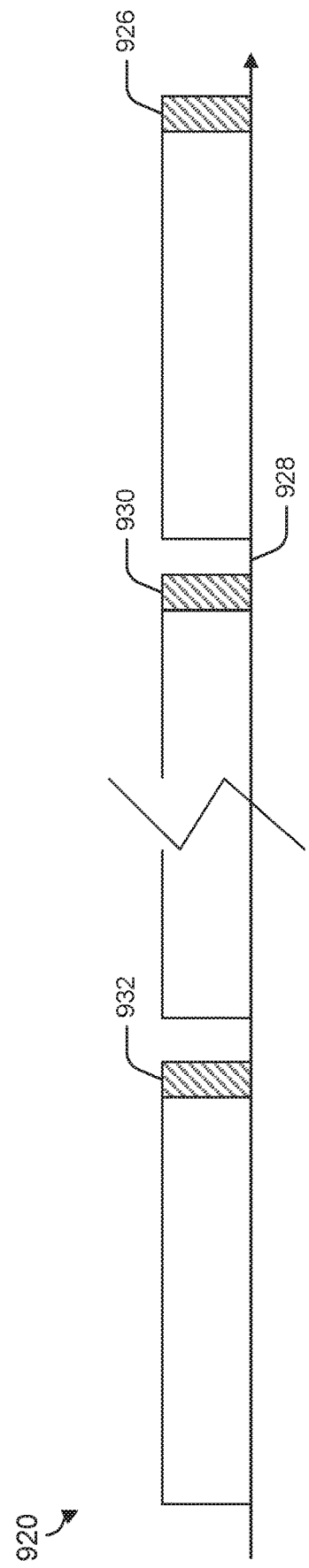

FIGS. 9A and 9B illustrate exemplary embodiments of frame structures for insertion into downstream and upstream signals, respectively. In one embodiment, the illustrated frame structures are a detailed embodiment of the header illustrated in FIG. 7, including a payload (data). Referring to FIG. 9A, illustrated is a downstream frame (e.g., data flow from the OTL to the ONUs) modulated on a downstream signal 900 that comprises a first ONU downstream header 916 for $ONU_1$ and a downstream payload for $ONU_1$ 912, as well as an n-th downstream header 908 for $ONU_n$ and a downstream payload for $ONU_n$ 904. In one embodiment, the downstream signal segment also includes FEC parity bits.

In the illustrated example, the downstream signal includes OOK modulation and a raw data rate fixed at $R_{DS}$. However, the downstream signal is not limited to such a configuration.

In some embodiments, the downstream header includes delimiter and control and management bits (CMB) for a segment of the downstream signal 900. For example, an $N^{th}$ downstream header ($DSH_N$) for DS payload $ONU_N$ includes a delimiter and CMB for that payload. In order to inform the ONU regarding the specific repetition code used, the CMB contains bits that indicate whether and how repetition is being used. For example, the CMB bits may indicate no repetition is being used, repeat once, repeat twice, etc. For example, the repetition code bits may be set to "0" to indicate no repetition, set to "1" to represent repeat once, set to "2" to represent repeat twice, etc. In some embodiments, the CMB also contains information about the forward error correction (FEC) used.

In the upstream direction (e.g., data flow from the ONUs to the OTL), and as shown in FIG. 9B, a frame structure 920 that is similar to the downstream signal 900 may be used. In one embodiment, in addition to the format of the downstream frame structure 900, a guard space 928 may be used between upstream TDMA bursts. The guard interval is used to ensure that neighboring TDMA signal segments do not electrically interfere with one another. In addition, the upstream headers 926, 930 and 932 may include a preamble to facilitate fast clock phase recovery of each upstream TDMA burst by providing clock synchronization information. When introducing such a preamble, the $N^{th}$ upstream header ($USH_N$) for US payload $ONU_N$ includes a delimiter, CMB and the preamble for that payload Similar to the downstream signal, in one embodiment the upstream signal 920 includes OOK modulation and a raw data rate fixed at $R_{DS}$. However, the upstream signal is not limited to such a configuration.

Figure 10A:
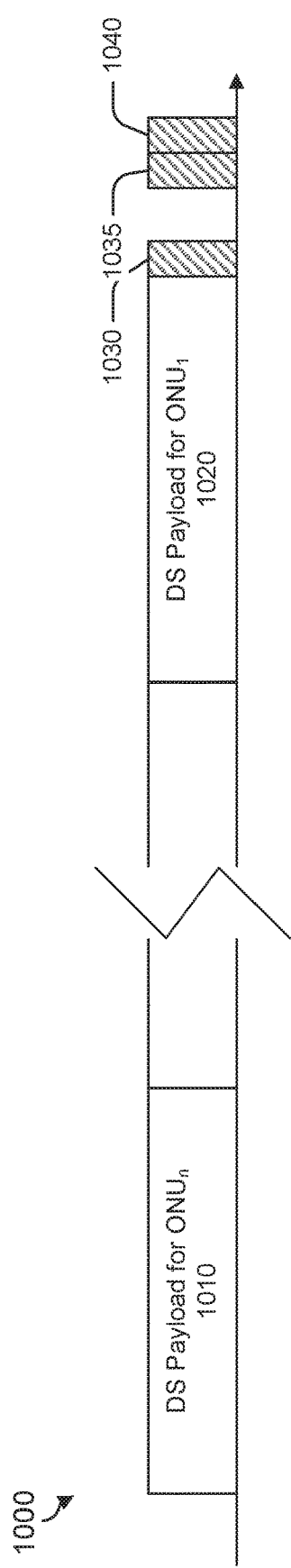
FIGS. 10A and 10B illustrate additional embodiments of frame structures for insertion into downstream and upstream signals.
Figure 10B:
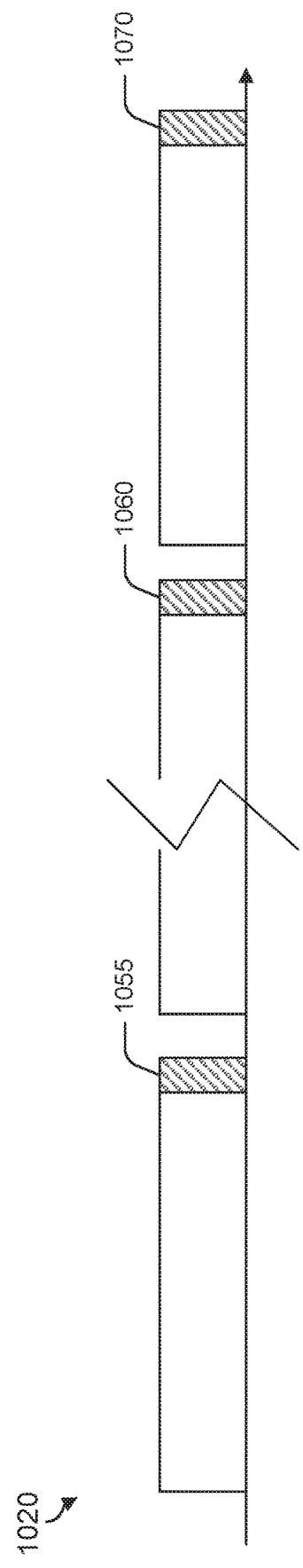

FIGS. 10A and 10B illustrate additional exemplary embodiments of frame structures for insertion into downstream and upstream signals, respectively. For these additional embodiments, a downstream frame, modulated on a downstream signal 1000, comprises a 1st downstream header (1040) for $ONU_1$, a 2nd downstream header (1035) for $ONU_2$ and an N-th downstream header (1030) for $ONU_n$. Thus, for these embodiments, the headers (1040, 1035 and 1030) are placed in succession in the frame. In some embodiments, the downstream headers consist of a delimiter and control and management bits (CMB), as well as information about the forward error correction (FEC) used for that downstream signal segment. The downstream payload data (1010 and 1020) for the specific ONUs then follow the headers (1040, 1035 and 1030).

In some embodiments shown in FIG. 9B, the frame structure, used in the upstream direction, is similar to the frame structure shown in FIG. 8B. For this embodiment, the upstream signal 1050 includes headers (1070, 1060 and 1055). The headers include, in addition to the preamble and delimiters, the upstream control and management bits (CMB). A guard space 1055 is inserted between upstream TDMA bursts.

Figure 11A:
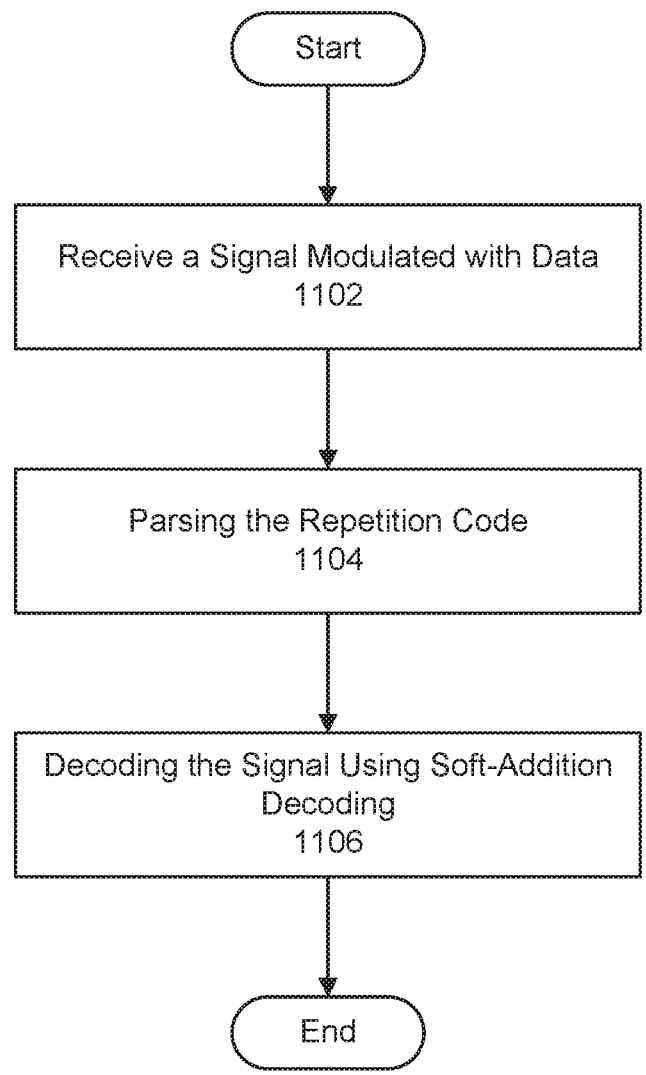
FIG. 11A is a flow diagram illustrating one embodiment of processing data in a PON.

FIG. 11A is a flow diagram illustrating one embodiment of processing data in a multipoint node of a point node-to-multipoint node or an ONU in a PON. The multipoint node/ONU receives a signal modulated with data 1102 (e.g., a bit sequence). The multipoint node/ONU parses the repetition code 1104, and decodes the signal using soft addition decoding, per the indication of the repetition code 1106. For example, if the repetition code indicates repetition of the data once (e.g., n="1"), then the multipoint node/ONU performs soft addition decoding based on two successive bits per the repeat once. By further way of example, if the repetition code indicates no repetition is used (e.g., n="0"), then the multipoint node/ONU performs no soft addition decoding on the data.

Figure 11B:
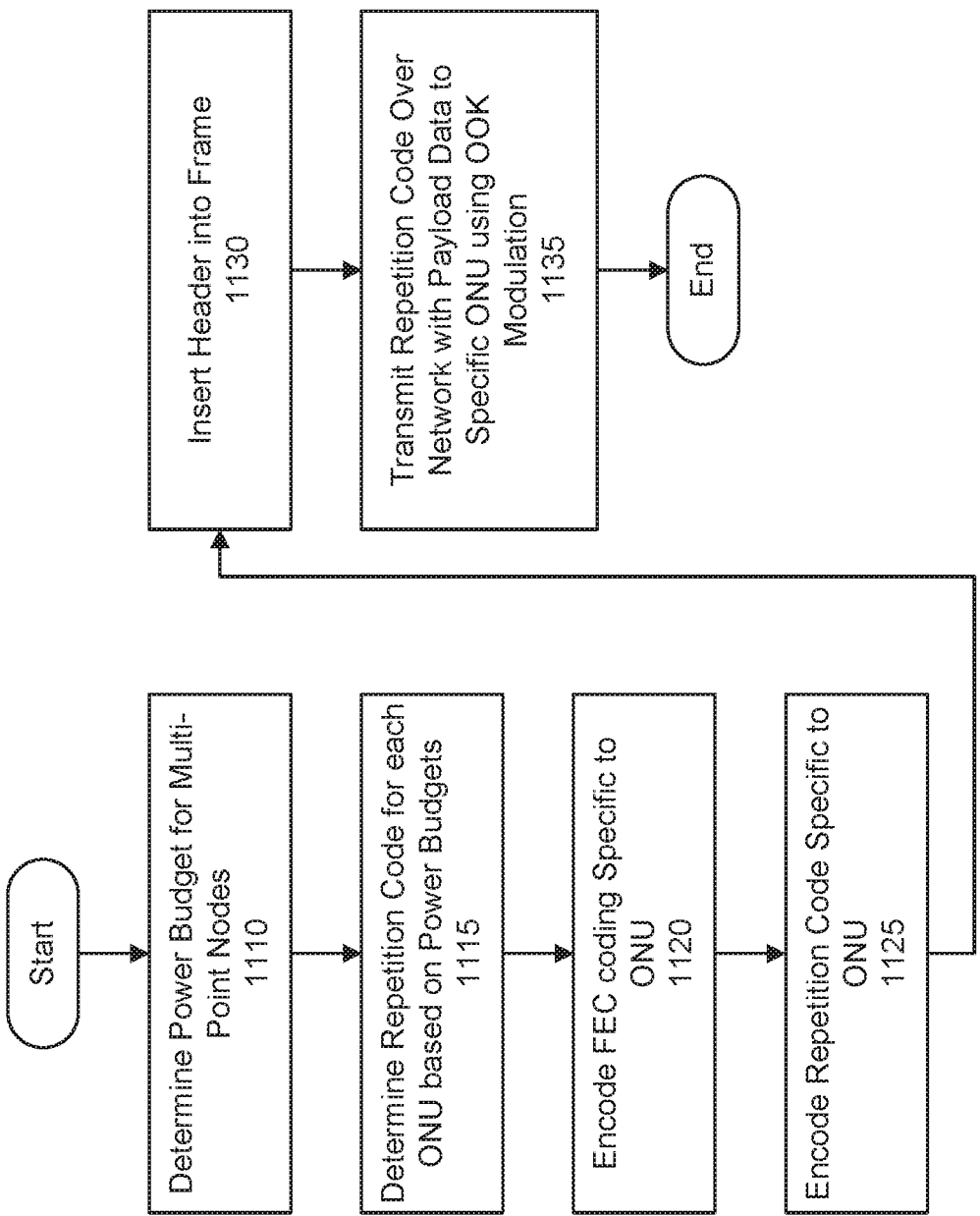
FIG. 11B is a flow diagram illustrating one embodiment for processing data at a point node.

FIG. 11B is a flow diagram illustrating one embodiment for processing data to implement the flexible PON at a point node (e.g., OLT). Power budgets for the multipoint nodes of the network are determined at 1110. Based on the power budgets of each individual connection, repetition codes are determined for the individual point node to multipoint node connections in order to conduct the coarse-tuning for the net data rate (e.g., determine repetition codes for $OLT-ONU_1$ through $OTL-ONU_n$) at 1115.

In order to conduct the fine-tuning for the net data rate for a specific OLT-ONU pair, a forward error correction (FEC) coding is encoded in the header at 1120. The repetition code, specific to the OLT-ONU pair, is also encoded in the header at 1125. The process inserts the header into a frame that corresponds to a signal segment at 1130. The signal segment, comprising both the header and payload data, is modulated, using OOK modulation, and processed for transmission across the fiber network at 1135.

Figure 11C:
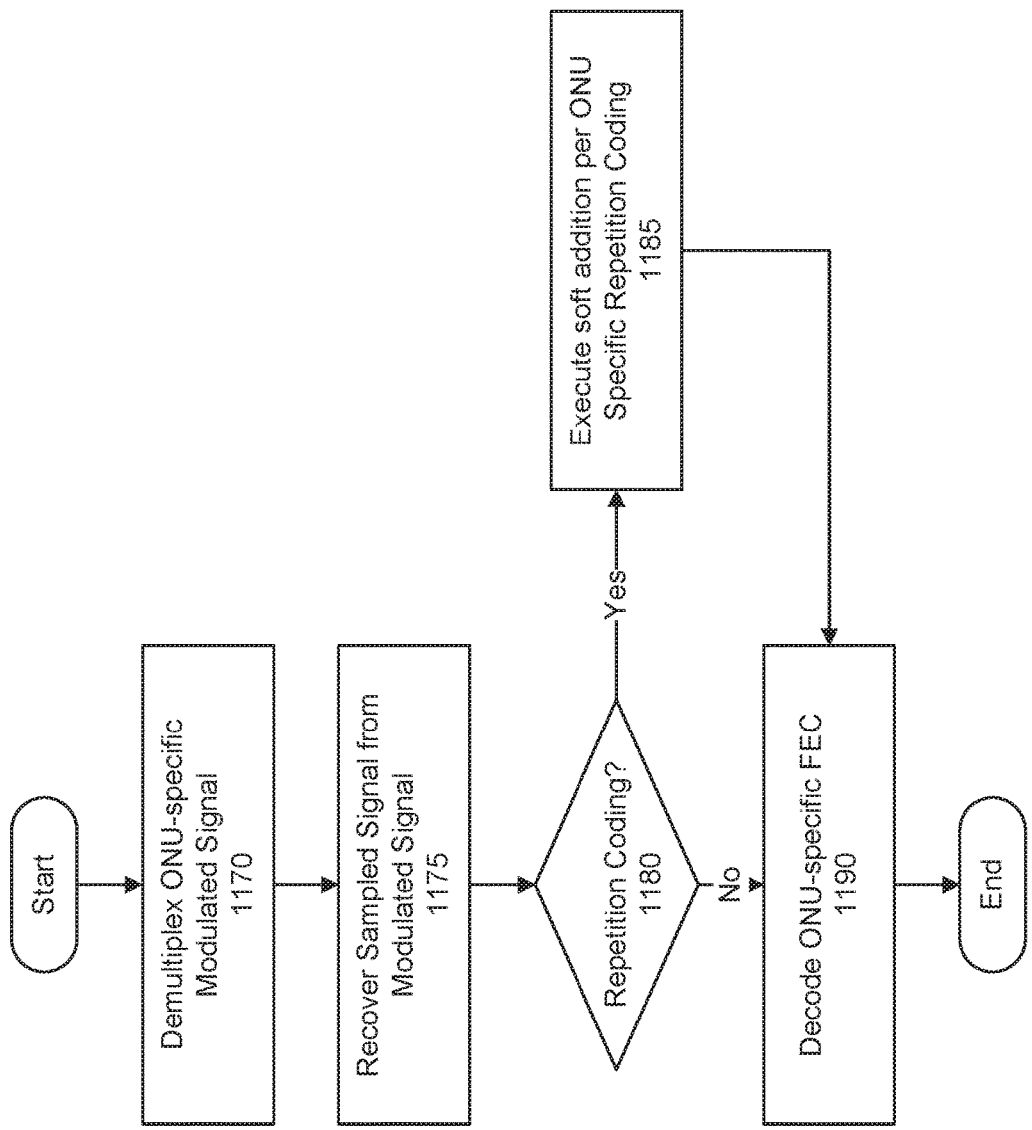
FIG. 11C is a flow diagram illustrating one embodiment for processing data at a multipoint node.

FIG. 11C is a flow diagram illustrating one embodiment for processes that implement the flexible PON at a multi-point node (e.g., ONU). The downstream signal from the network is received at the ONU, and the downstream signal, intended for the ONU, is extracted at 1170. Then, using a downstream receiver at the ONU, a sampled signal is generated from the modulated downstream signal at 1175. The ONU determines whether repetition coding was used at 1180. If so, the ONU executes a soft addition function in accordance with the ONU-specific repetition coding at 1185. For example, if the header indicates that the repetition code is set to "2", then the ONU performs soft addition by using two successive bits to estimate the digital value of a symbol. In some embodiments, the ONU performs soft addition by adding the bits and quantizing the value based on the average of those bits. Alternatively, if no repetition coding is used, then the ONU performs forward error correction (FEC) decoding at 1190. Recovered data is transferred to the MAC.

The technology described herein can be implemented using hardware, software, or a combination of both hardware and software. The software used is stored on one or more of the processor readable storage devices described above to program one or more of the processors to perform the functions described herein. The processor readable storage devices can include computer readable media such as volatile and non-volatile media, removable and non-removable media. By way of example, and not limitation, computer readable media may comprise computer readable storage media and communication media. Computer readable storage media may be implemented in any method or technology for storage of information such as computer readable instructions, data structures, program modules or other data. Examples of computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. A computer readable medium or media does (do) not include propagated, modulated or transitory signals.

Communication media typically embodies computer readable instructions, data structures, program modules or other data in a propagated, modulated or transitory data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

In alternative embodiments, some or all of the software can be replaced by dedicated hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), special purpose computers, etc. In one embodiment, software (stored on a storage device) implementing one or more embodiments is used to program one or more processors. The one or more processors can be in communication with one or more computer readable media/storage devices, peripherals and/or communication interfaces.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A communication method in a point-to-multi-point communication network, comprising: receiving, by a node of the point-to-multi-point communication network, a transmission frame comprising a header including repetition information and a data section comprising multiple modulation symbols, the repetition information specifying whether repetition of modulation symbols in each transmission frame occurs and if so an amount of repetition, with at least two repeated modulation symbols of the multiple modulation signals in the frame being repeated in accordance with the repetition information to represent a first modulation symbol; extracting, by the node, the repetition information of the header; quantifying, by the node, the amplitude of each modulation symbol of the at least two repeated modulation symbols; and combining, by the node, the amplitudes of the at least two repeated modulation symbols, based on the repetition information, to reconstruct the first modulation symbol represented by the at least two repeated modulation symbols; recover at least a segment of the digital signal during each cycle of the point-to-multi-point network; and add amplitudes of repetitive symbols received in the downstream signal that are modulated with the repetition information.

2. The method of claim 1, with the node comprising a point node or a multi-point node of a plurality of multi-point nodes in the point-to-multi-point communication network, wherein the point-to-multi-point network comprises a passive optical network (PON), the transmission frame comprises an optical transmission frame, the point node comprises an optical line terminal (OLT), and the plurality of multi-point nodes comprise a plurality of optical network units (ONUs).

3. The method of claim 1, further comprising performing, by the node, equalization on the two or more repeated modulation symbols before the combining.

4. The method of claim 1, wherein the combining comprising performing, by the node, soft addition of the amplitudes of the two or more repeated modulation symbols.

5. The method of claim 1, wherein the combining comprising performing, by the node, averaging of the amplitudes of the two or more repeated modulation symbols.

6. The method of claim 1, further comprising performing, by the node, forward-error-correction (FEC) decoding on the first modulation symbol after performing the combining.

7. The method of claim 1, further comprising performing, by the node, forward-error-correction (FEC) decoding on the multiple modulation symbols after performing the combining.

8. The method of claim 1, wherein the header is FEC encoded.

9. The method of claim 1, wherein the header is FEC encoded and repeated.

10. A node of a point-to-multipoint network, comprising: a receiver configured to: receive a transmission frame comprising a header including a repetition information and a data section comprising multiple modulation symbols, the repetition information specifying whether repetition of modulation symbols in the transmission frame occurs and if so an amount of repetition, the data section including at least two repeated modulation symbols in the frame that are repeated in accordance with the repetition information to represent a first modulation symbol; and a data recovery stage coupled to the receiver and configured to: extract the repetition information of the header; quantify the amplitude of each modulation symbol of the at least two repeated modulation symbols; and combine the amplitudes of the at least two repeated modulation symbols, based on the repetition information, to reconstruct the first modulation symbol represented by the at least two repeated modulation symbols; perform data recovery on at least a segment of the digital signal during each cycle of the point-to-multipoint network; and perform addition of amplitudes of repetitive symbols received in the downstream signal that are modulated with the repetition information.

11. The node of claim 10, with the node comprising a point node in the point-to-multi-point communication network or comprising a multi-point node of a plurality of multi-point nodes in the point-to-multi-point communication network, wherein the point-to-multi-point network comprises a passive optical network (PON), the transmission frame comprises an optical transmission frame, the point node comprises an optical line terminal (OLT), and the plurality of multi-point nodes comprise a plurality of optical network units (ONUs).

12. The node of claim 10, further comprising performing, by the node, equalization on the two or more repeated modulation symbols before the combining.

13. The node of claim 10, wherein the combining comprising performing, by the node, soft addition of the amplitudes of the two or more repeated modulation symbols.

14. The node of claim 10, wherein the combining comprising performing, by the node, averaging of the amplitudes of the two or more repeated modulation symbols.

15. The node of claim 10, further comprising the data recovery stage performing forward-error-correction (FEC) decoding on the first modulation symbol after performing the combining.

16. The node of claim 10, further comprising the data recovery stage performing forward-error-correction (FEC) decoding on the multiple modulation symbols after performing the combining.

17. The node of claim 10, wherein the header is FEC encoded.

18. The node of claim 10, wherein the header is FEC encoded and repeated.

19. A communication method in a point-to-multi-point communication network, comprising: generating, by a node, a transmission frame comprising a header and a data section comprising multiple modulation symbols; obtaining, by the node, a repetition information specifying whether repetition of modulation symbols in the transmission frame occurs and if so an amount of repetition; repeating, by the node, at least one modulation symbol in the data section of the transmission frame to create at least two repeated modulation symbols, with the at least two repeated modulation symbols being repeated according to the repetition information and to represent a first modulation symbol; adding, by the node, the repetition information to the header; and transmitting, by the node, the plurality of transmission frames; wherein the repetition information allows data recovery on at least a segment of the data section during each cycle of the point-to-multipoint network using an addition of amplitudes of repetitive modulated symbols.

20. The method of claim 19, with the node comprising a point node in the point-to-multi-point communication network or comprising a multi-point node of a plurality of multi-point nodes in the point-to-multi-point communication network, wherein the point-to-multi-point network comprises a passive optical network (PON), the transmission frame comprises an optical transmission frame, the point node comprises an optical line terminal (OLT), and the plurality of multi-point nodes comprise a plurality of optical network units (ONUs).

21. The method of claim 19, further comprising performing, by the node, forward error correction (FEC) encoding before the repeating.

22. The method of claim 19, further comprising performing, by the node, FEC encoding on the header.

23. The method of claim 19, further comprising performing, by the node, FEC encoding on the header and performing repeating on the header.

24. The method of claim 19, further comprising performing by the node, FEC encoding on the header and the data section, with the data section being FEC encoded before the repeating, wherein a FEC encoding rate is configurable.

25. A node of a point-to-multipoint network, comprising: a data processing stage configured to: generate a transmission frame comprising a header and a data section comprising multiple modulation symbols; obtain a repetition information specifying whether repetition of modulation symbols in the transmission frame occurs and if so an amount of repetition; repeat at least two modulation symbols in a data section of the transmission frame comprising the multiple modulation symbols, with the repeating performed according to the repetition information and with the at least two modulation symbols being included in the data section and the multiple modulation symbols, the repetition information allowing data recovery on at least a segment of the data section during each cycle of the point-to-multipoint network using an addition of amplitudes of the at least two repetitive modulated symbols; add the repetition information to the header; and a transmitter coupled to the data processing stage and configured to transmit the transmission frame.

26. The node of claim 25, with the node comprising a point node in the point-to-multi-point communication network or comprising a multi-point node of a plurality of multi-point nodes in the point-to-multi-point communication network, wherein the point-to-multi-point network comprises a passive optical network (PON), the transmission frame comprises an optical transmission frame, the point node comprises an optical line terminal (OLT), and the plurality of multi-point nodes comprise a plurality of optical network units (ONUs).

27. The node of claim 25, further comprising the data processing stage performing, by the node, forward error correction (FEC) encoding before performing the repeating.

28. The node of claim 25, further comprising the data processing stage performing FEC encoding on the header.

29. The node of claim 25, further comprising the data processing stage performing FEC encoding on the header and performing repeating on the header.

30. The node of claim 25, further comprising the data processing stage performing FEC encoding on the header and the data section, with the data section being FEC encoded before the repeating.

31. The node of claim 25, further comprising the data processing stage performing FEC encoding on the header and the data section, with the data section being FEC encoded before the repeating, wherein a FEC encoding rate is configurable.

* * * * *